May 6, 1941.  W. WENZIG  2,241,285

COPYING LATHE

Filed March 24, 1937   6 Sheets-Sheet 1

Inventor:
Willy Wenzig
Frank S. Appleman
attorney.

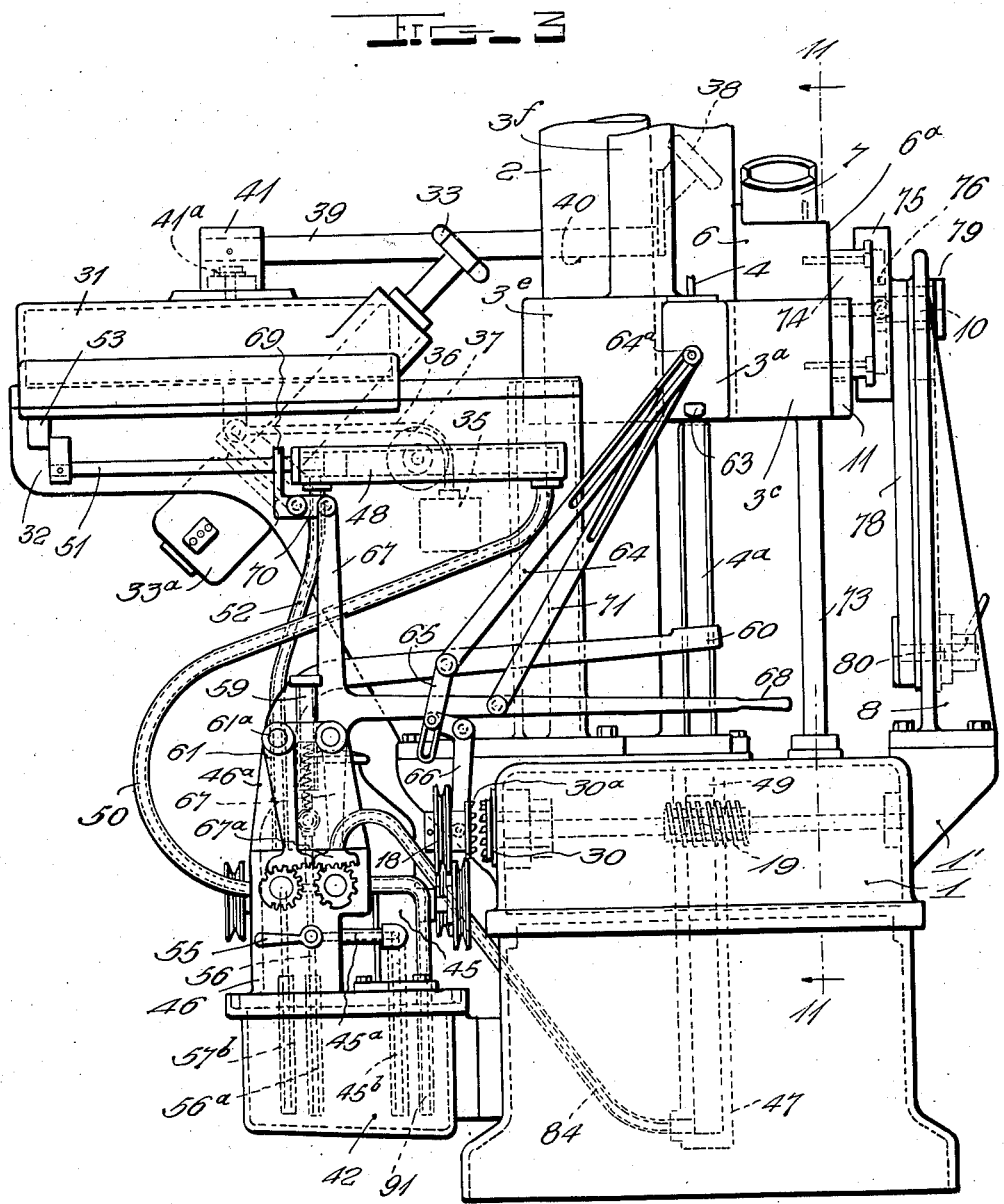

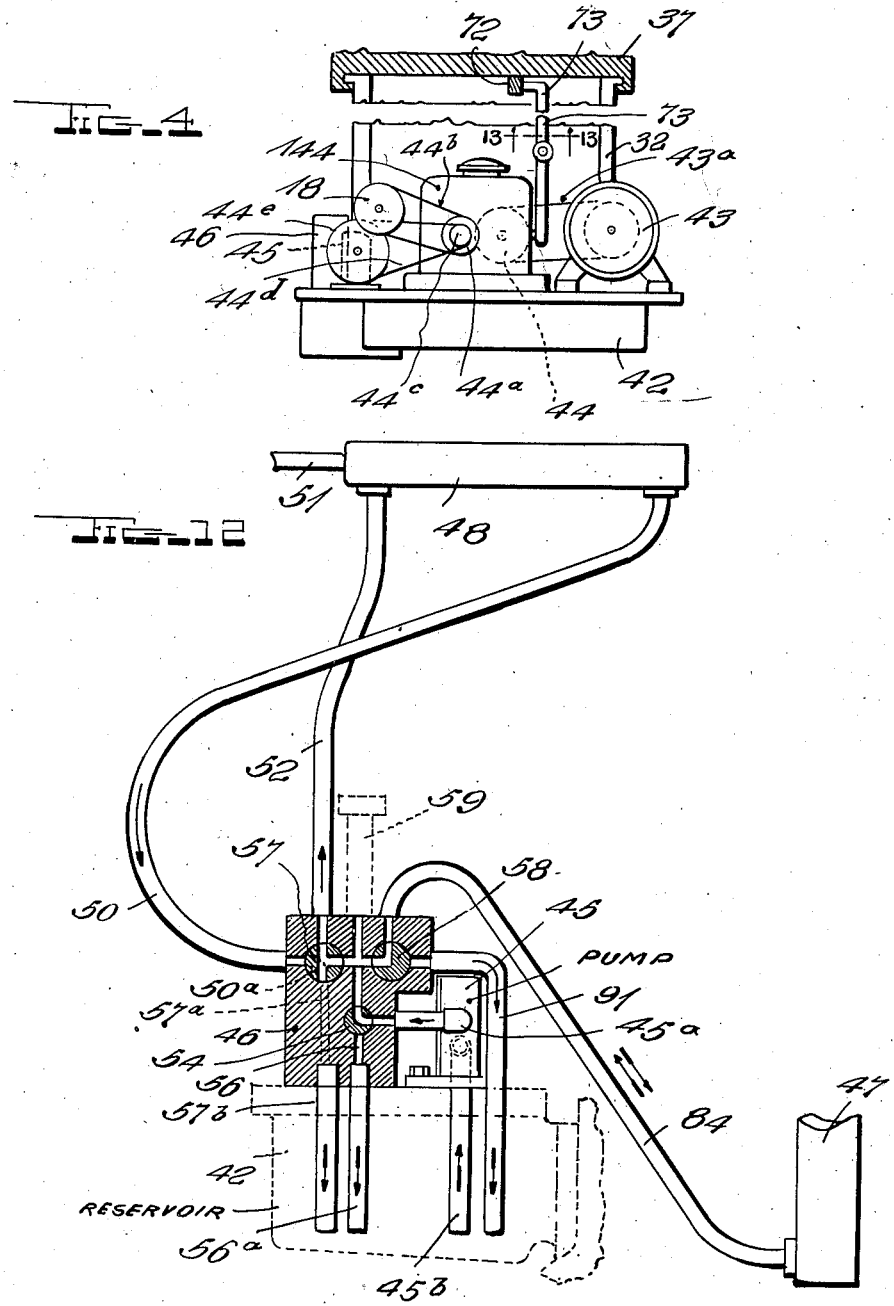

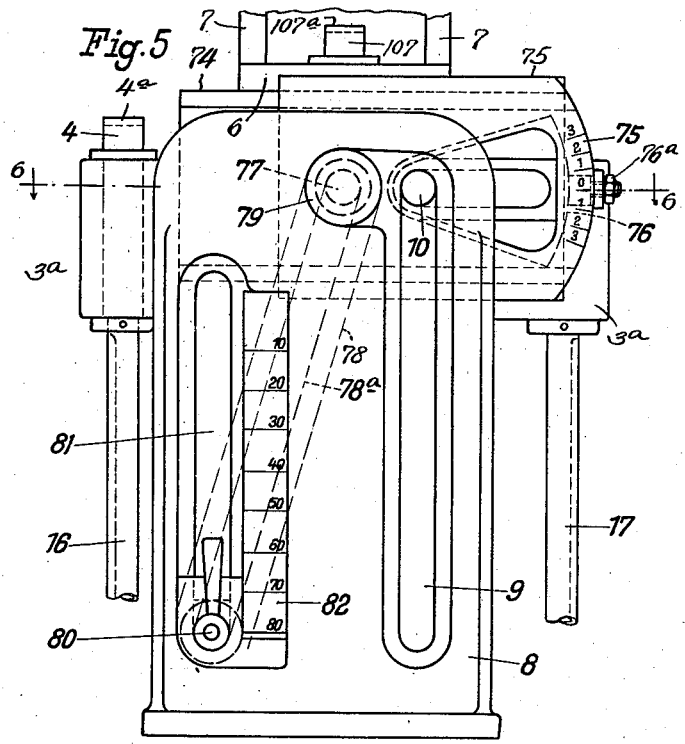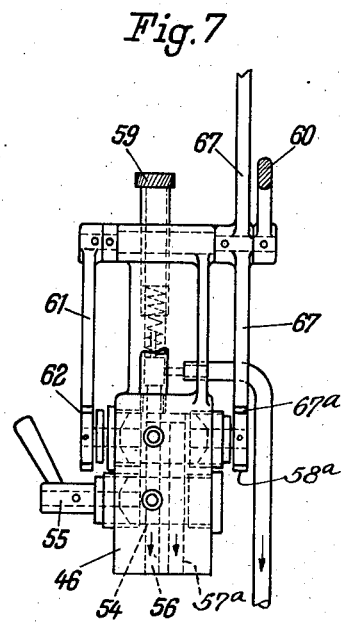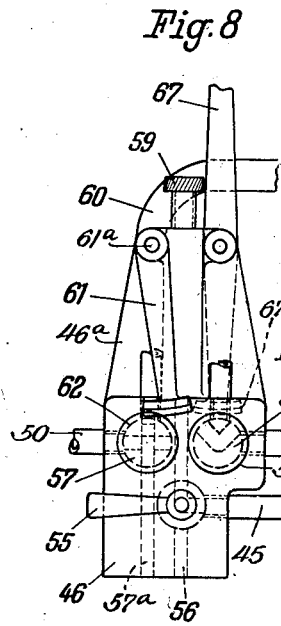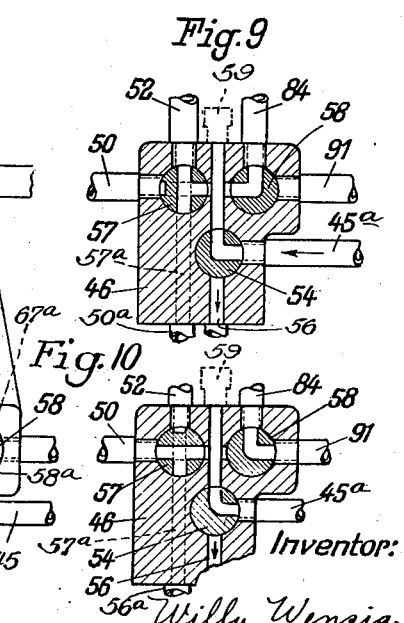

May 6, 1941.  W. WENZIG  2,241,285
COPYING LATHE
Filed March 24, 1937  6 Sheets-Sheet 5
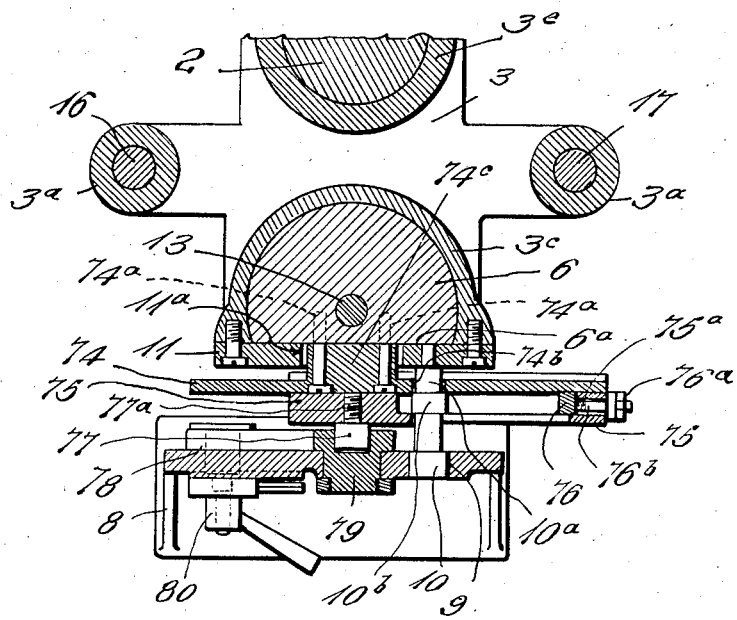
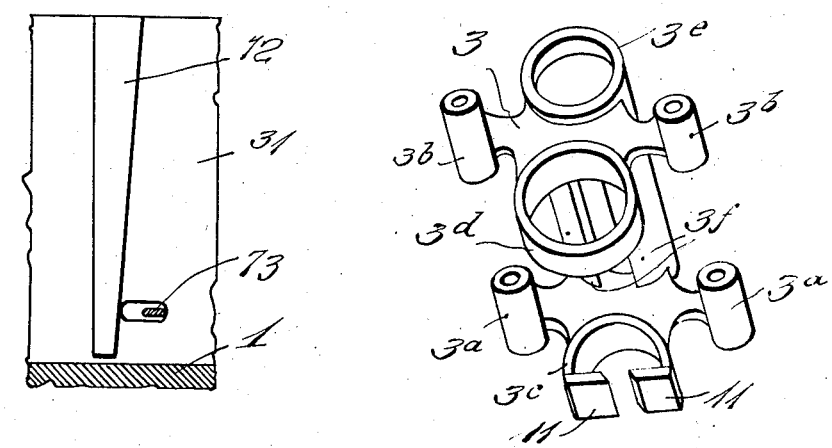
INVENTOR.
W. Wenzig,
BY
ATTORNEY.

May 6, 1941.  W. WENZIG  2,241,285
COPYING LATHE
Filed March 24, 1937  6 Sheets-Sheet 6
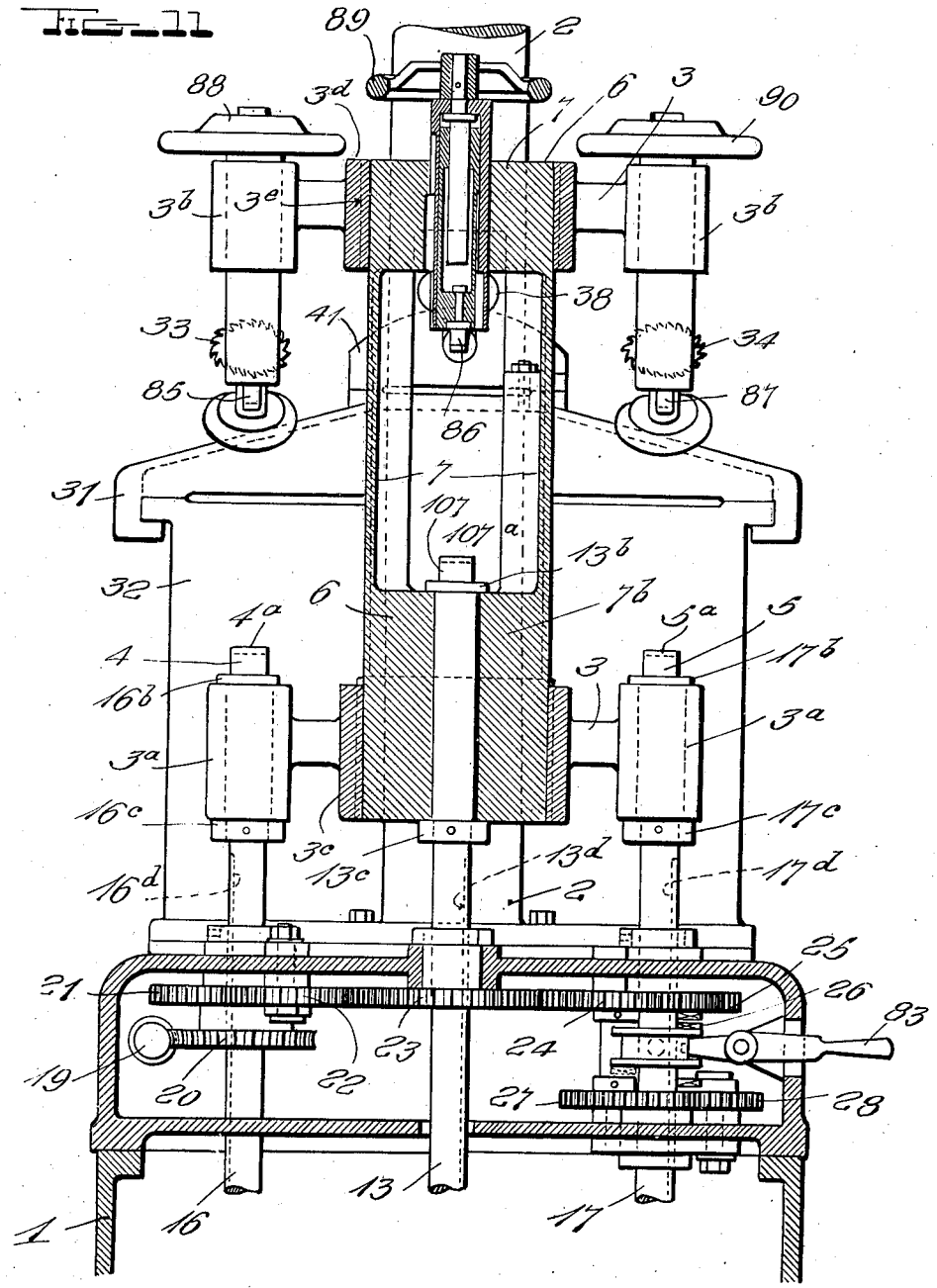
INVENTOR.
W. Wenzig,
BY
Frank S. Appleman
ATTORNEY.

Patented May 6, 1941

2,241,285

UNITED STATES PATENT OFFICE 2,241,285

COPYING LATHE

Willy Wenzig, Leipzig, Germany

Application March 24, 1937, Serial No. 132,835
In Germany March 31, 1936

3 Claims. (Cl. 142—13)

This invention relates to a copying lathe for making non-circular forms, particularly lasts, for turning out work of a given pattern.

Copying lathes for shaping one or more blanks after a pattern are well-known. The work, patterns and tools are driven mechanically, and in order to attain uniform cutting speeds it has been proposed to interpose regulating gears controled by special regulating discs, which permit also variations in the speed of the work. These known regulating gears involve, however, relatively difficult and slow adjustment and for this reason can be employed only for slowly moving work and patterns or where variations in diameter are quite slight. In case of abnormally large variations in diameter it has further been proposed to increase or decrease speed gradually by means of an intermediate gearing, but this construction is open to the objection that with respect to highly irregular work or work differing considerably in diameter full utilization of cutting speeds cannot be effected. It is further known to locate the tools hydraulically.

The copying lathe according to the invention avoids the drawbacks mentioned and is capable of automatically regulating the cutting speed by automatically and gradually varying the speed of rotation of the work and pattern in accordance with the diameter of the pattern. This varying of the speed is carried out without perceptible gradation and is accomplished even at relatively high speed and great irregularity of the work, in an economically most favorable manner adapted to different diameters of work and insuring also most advantageous feed of the tools relative to the work. Furthermore, the lathe according to the invention works fully automatically, except for fixing the work, and automatically controls operation and idling as well as starting and stopping.

Figure 1:
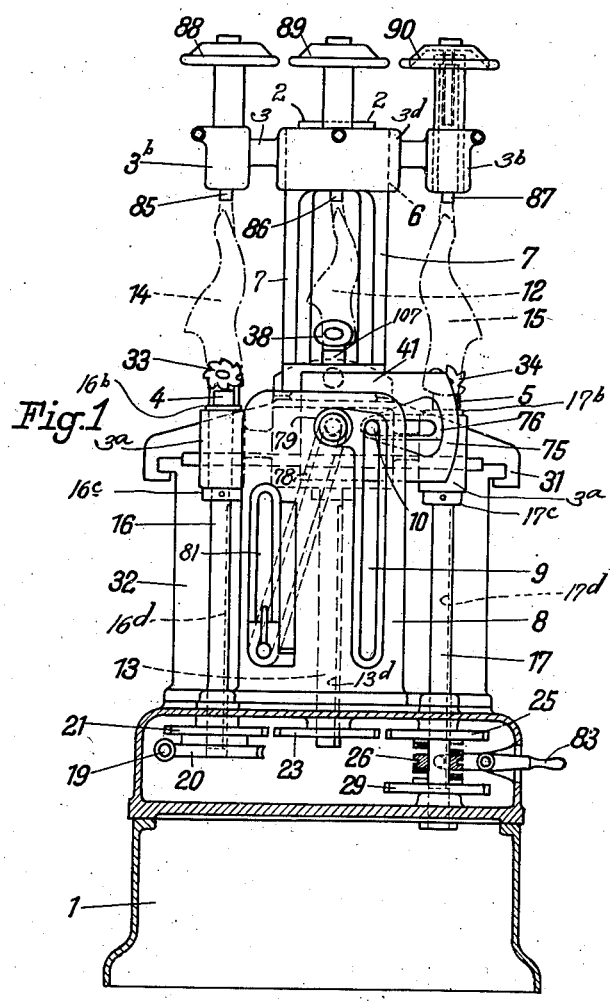
Figure 2:
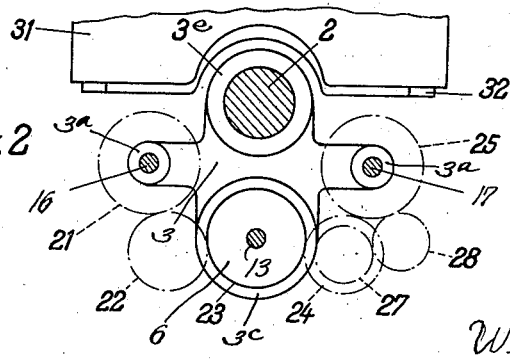

By way of example, the invention is illustrated in the accompanying drawings, in which Figure 1 is a front elevation, partly in section, of the machine in position of rest; Fig. 2, a partial plan showing the pattern and tool carriers and the transmission wheels for the rotary motions; Fig. 3, partial side view of the machine in inoperative position; Fig. 4, an enlarged partial back view partly in section showing the drive for the machine; Fig. 5 is an enlarged partial elevation of the enlarging and reducing means for the work; Fig. 6, a horizontal section according to the line 6—6 of Fig. 5; Fig. 7 is an elevation of the valve casing; Fig. 8 is a side view of the valve casing with the valve at rest; Fig. 9 is a partial sectional view of the valve position during upward motion; and Fig. 10 is a partial sectional view of the valve position during downward motion; Fig. 11 is an enlarged partial, vertical section taken on the line 11—11 of Fig. 3; Fig. 12 is a diagrammatic development of Fig. 9 showing the connections between the valve casing 46, the pump 45, cylinder 48 and cylinder 47; Fig. 13 is a fragmentary horizontal section taken substantially on the line 13—13 of Fig. 4; Fig. 14 is a perspective of the carriage 3 apart from the rest of the structure.

In the base 1 there is a guide post 2 of circular diameter, on which a movable carriage 3 is vertically slidably mounted by means of bores $3^e$ at either end thereof. The carriage 3 comprises a pair of end portions connected by elongated side pieces $3^f$ and has at its lower end two laterally projecting guiding eyes $3^a$, in which spindles 16, 17, whose ends are shaped as lower conventional work holders 4, 5 are rotatably mounted. In the same way, two laterally protruding guiding eyes $3^b$ are provided at the upper end of the carriage 3 with their axis alined with those of the eyes $3^a$ and in which upper conventional work holders 85, 87 are rotatably mounted and which can be adjusted in a vertical direction by means of hand wheels 88, 90. At the lower end, the carriage 3 has, in addition, a guide eye $3^c$ which protrudes rearwardly from the center of the lower end of said carriage and which corresponds to a guide eye $3^d$ that is equiaxial with eye $3^c$ and which protrudes at the upper end of the carriage 3. In the guide eyes $3^c$ and $3^d$ of the carriage 3, a guide 6, mainly cylindrical, is vertically slidable and whose center portion or carrier 7 is shaped like a hollow cylinder with elongated openings in opposite walls. The ends of guide 6 are shaped to fit in guides $3^c$ and $3^d$ and the lower end of guide 6 is flattened on one side as at $6^a$. This portion $6^a$ is provided to prevent any turning of the guide 6 in the guide eyes $3^c$, $3^d$. The lower guide eye $3^c$ of the carriage 3 terminates in the plane of the portion $6^a$ of the lower end of guide 6 and that portion is partially covered by two plates 11 mounted on the eye $3^c$ (Fig. 6) which have a central space $11^a$ between them.

To prevent the twisting of the carriage 3 on the guide post 2, a fixed guide 8, longitudinally slotted as at 9, is mounted on a projection 1' provided on the base 1. In the longitudinal slot 9 a guide roller 10 is placed which is mounted on a bolt 10' which in turn is mounted in a cover lid 11 (Figs. 3 and 5).

In an axial bore of the lower end of the guide 6, a spindle 13 is rotatably mounted whose upper end protrudes therefrom into the center part 7 of the guide 6 and provides a pattern holder 107 opposite to which in the upper part of guide 6 is an upper guide device 86 which is vertically adjustable by means of the hand wheel 89.

The pattern 12 is driven by the feed spindle 13, and the blanks 14 and 15 are actuated by the spindles 16, 17 in the usual manner through rotation of the holders 4, 5 and 107. Setting is effected in the usual manner by moving the centers 85, 86, 87 toward the holders 4, 5 and 107 by means of the hand wheels 88, 89, 90 until the work and pattern are gripped therebetween. Rotary motion is transmitted from the driving pulley 18 by means of the worm shaft 19, the worm wheel 20 firmly connected with the gear wheel 21 on the shaft 16, the intermediate gear wheel 22, the gear wheel 23 on shaft 13 and the intermediate wheel 24 to the gear wheel 25 on the shaft 17 (Figs. 2, 11). By means of the gear wheels 21, 23, 25 disposed in the base 1 the feed spindles 13, 16, 17 are rotated at uniform speed, but they are vertically displaceable so as to follow the displacements of the carriage 3. The shafts 16, 13 and 17 have spaced collars 16$^b$, 16$^c$, 13$^b$, 13$^c$ and 17$^b$ and 17$^c$ fixed thereon. These shafts extend respectively through bearings 3$^a$, 7$^b$ and 3$^a$ in the carriage 3, carrier 7 and carriage 3. The said collars abut on either side of the said bearings whereby the said shafts are carried along with said carriage 3 and carrier 7 as the two move vertically. These shafts have longitudinal splines 16$^d$, 13$^d$ and 17$^d$, respectively whereby they are connected for sliding movement with the gears 20 and 21, 23 and 25, 29. For reversing the directions of rotation of the spindle 17 a clutch 26 is provided which can be operated by a lever 83 and whereby also rotary motion can be transmitted from the gear wheel 23 to the gear wheel 29 by means of the intermediate wheels 27, 28.

A clutch 30 on the worm shaft 19 serves for starting and stopping rotary motions.

The tool carriage 31 slides on a guide 32 secured to the base 1 and carries the tools 33, 34, the shafts of each of which are driven directly by motors 33$^a$ (only one of which is shown) mounted on the bearings of the shafts. A weight 35 is attached to the carriage 31 by a chain 36 which passes over the roll 37 in the guide 32 and has the tendency to move said carriage and tools in the direction of the work blanks 14, 15. The profiling roller 38 is rotatably disposed on the pin 39 one end of which is axially displaceably guided in a bore 40 of the guide post 2 and the other end of which is secured in the bearing 41 of the carriage 31 to prevent rotation.

A bracket 42 is provided on the front of the frame 1 and is formed to provide a reservoir for the circulating fluid thereof. Intake conduit 45$^b$ of the pump 45 terminates therein as do the discharge conduits 57$^b$, 56$^a$ and 91 of the valve casing 46.

To the bracket 42 the motor 43 is secured which drives a belt 43$^a$ and a gear 44.

The gear 44 is connected to a transmission of known form (not shown) which is contained in the casing 144 and by which speed is varied without perceptible gradation. The gear 44 is geared to and drives the double pulley 44$^a$, 44$^c$ which in turn drive the belts 44$^b$, 44$^d$ and the pulley 18 for the rotary motions of the pattern 12 and of the blanks 14, 15, and also drives the pulley 44$^e$ of the pump 45 which forces a stream of liquid through the valve casing 46 and the flexible tubes 84 and 50 into the cylinders 47, 48. When the liquid enters the cylinder 47, the piston 49 and the attached carriage 3 are lifted. The current of liquid enters the cylinder 48 through the flexible tube 50 and presses the piston 51 towards the rear where it engages a stop 53 of the carriage 31 and drives the latter. To reverse the operation the liquid is directed through the flexible tube 52 and the piston 51 is drawn again into the cylinder 48, so that the stop 53 of the carriage 31 is released and the carriage, owing to the action of the weight 35, slides forward.

In the valve casing 46 a main valve 54 is arranged which can be reversed and which in reversed position returns the liquid through the return conduit 56, so that the liquid has not done any work. On the other hand, when the valve 54 is in operative position, it permits the current of liquid to pass to the intermediate valves 57 and 58, equalization of pressure being effected by an overpressure valve 59.

The intermediate valve 57 is closed by means of a lever 60 connected by a pin with the toothed segment 61 which engages a toothed wheel 62 on the intermediate valve 57. The stop 63 on the carriage 3, (Fig. 3), engages the lever 60 near the limit of descent of said carriage, and in the end position after ascent a strap 64 which is pivotally connected to the lever 60 by a slotted connection with the pin 64$^a$ secured on one of the eyes 3$^a$ of the carriage 3 and moves back the lever 60 (Fig. 3).

The lever 60 is further connected by a strap 65 which has a slotted connection with the coupling lever 66 which controls the clutch 30. It is apparent from Fig. 3 that the free end of the lever 66 is pivotally engaged with the movable element 30$a$ of the clutch 30 and that a downward movement of the lever 60 forces the element 30$^a$ into driving engagement. This occurs by the connection 65 being carried down with the lever 60 thereby depressing the short arm of lever 66 and moving the long arm thereof to the right (Fig. 3). The long arm of lever 66 being pivotally connected to 30$a$ carries the same with it.

Fig. 12 shows diagrammatically the circulation of the fluid. Fluid is drawn from the reservoir 42 to the intake side of the pump 45 by way of a conduit 45$^b$ and passing from the discharge side of the pump through a conduit 45$^a$ to the valve casing 46. The fluid is then passed to the cylinder 47 through valves 54 and 58 and conduit 84 and to cylinder 48 through valves 54 and 57 and either conduit 50 or 52 in accordance with the way the valve 57 is set. Fluid returns to reservoir 42 from cylinder 47 through conduit 84, valve 58 (in reversed position from that of Fig. 12) and conduit 91. Fluid returns from the left end of cylinder 48 through conduit 52, valve 57, passage 57$^a$ and conduit 57$^b$. From the right end of cylinder 48 fluid returns through conduit 50, a by-pass 50$^a$, in valve 57, passage 57$^a$ and conduit 57$^b$. As aforesaid, when valve 54 is reversed from the Fig. 12 position, fluid merely passes from the pump 45 back to reservoir 42 via passage 56 and conduit 56$^a$.

The intermediate valve 58 is controlled by the lever 67. For starting the machine the handle 68 on lever 67 is employed, reversing is effected by the stop 69 guided on the piston rod 51 and connected with the lever 67 by the strap 70, and the middle position at topmost position of the carriage 3 is brought about by means of the strap 71 which connects the handle 68 of the lever 67 with the pin 64ª secured on the carriage 3 by a slotted connected. As shown in Figs. 3, 7 and 8, the lever 67 is T-shaped with the leg providing the handle 68. The lower arm provides a toothed segment 67ª for actuating a gear wheel 58ª for actuating the valve 58''.

Speed is regulated in any suitable manner as by an inclined plane 72 (Fig. 4) secured to the tool carriage 31 and adapted to move a lever 73, according to the displacements of the carriage 31, which appropriately actuates the speed change gearing in casing 144 and thereby controls driving speed. Owing to the regulation of the speed of the driving pulley 18, the speed of rotation of the pattern 12 and of the blanks 14, 15 is regulated also as well as the speed of the driving pulley for the pump 45 and thus the output and the more rapid or slower motion of the piston 49 and thereby the motion of the carriage 3.

To permit proportional enlargement or reduction of the work 14, 15 relative to the pattern 12 the lower end of the pattern carrier 6, 7 is provided with a horizontal guide 74 having an abutment 74ᶜ which is fixed to the flattened portion of the carrier 6 by screws 74ª between the cover plates 11. A vertical slot 74ᵇ is provided in 74 to permit movement of the pin 10ª with respect thereto. On the guide 74, a casing 75 slides, in which a roller guideway 76 is oscillatorily and adjustably arranged. In the roller guideway 76 slides a roller 10ᵇ rotatably mounted on the pin 10ª of the roller 10. The pin 10ª is seated in one of the plates 11 and extends through the slot 74ᵇ of guide 74 as aforesaid. The roller guideway 76 can be adjusted in the casing 75 around the roller 10ᵇ along an arcuate scale by any suitable means such as a radially extending stud 76ᵇ of guideway 76 which extends through a vertical slot 75ª in the casing 75. The guideway 76 may be held in any adjusted position by means of a clamping nut 76ª on the stud 76ᵇ.

A roller 77 rotatably mounted on the casing 75 by means of a pin 77ª slides in a guide slot 78ª of an inclined and adjustable guide 78 which is oscillatively mounted at its upper end by means of a pin-like abutment 79 to the back side of the fixed guide 8. The lower end of the guide 78 is clamped to the fixed guide 8 by a clamping nut 80. The clamping nut 80 is slidable in the guide slot 78ª and in a vertical slot 81 of the guide 8, which slot 81 is provided at one side with a scale 82 indicating the length of the pattern. The vertical adjustment feature of the nut 80 in slot 81 forms no part of the present invention.

By adjusting the nut 80 and the inclination of the guideway 76, the machine can be adjusted in accordance with the lengths of various sized patterns, and workpieces having different sizes relative to the length of the pattern 12 can be produced, as will be described later.

The machine functions as follows:

After completion of axial displacement the carriage 3 for holding the work and with member 6 for holding the pattern are in their topmost positions, the rotary motions of the carrier for the work 14, 15 and of the carrier for the pattern 12 are stopped, and the tool carriage 31 is fully drawn back. Then the pattern 12 and the work 14, 15 are set, as indicated in Figs. 1 and 3. By means of the handle 68 the lever 55 is rotated in a clockwise direction to move the main valve 54 to the position of Figs. 9 and 10. The intermediate valve 58 is moved from the neutral position of Fig. 8 by lever 67 to the position of Fig. 10 so as to pass liquid from cylinder 47 and provide an outlet for the liquid enclosed in the cylinder 47 under the piston 49 and by the weight of the carriage 3 to press back this liquid through the flexible tube 84, the intermediate valve 58, and the conduit 91 into an oil container, 42 in the pump 45. During this descent the tool carriage 31 is kept in rearmost or inoperative position by means of the stop 53 and the piston 51 due to the liquid pressure of the still working pump, the liquid entering the cylinder 48 through the intermediate valve 57 and the flexible tube 50.

When the carriage arrives at lowermost position, it moves by its stop 63 the lever 60 and thus the intermediate valve 57 into the position shown in Fig. 9. This means that the passage through the flexible tube 52 to the cylinder 48 is open, so that the current of liquid of the pump 45 pushes back the piston 51 into the cylinder 48 and thereby releases the stop 53 of the tool carriage 31 which, owing to the action of the weight 35, moves in the direction of the work 14, 15 until the profiling roller 38 abuts against the pattern 12.

Simultaneously with the reversing of the intermediate valve 57 by the lever 60 the coupling lever 66 is moved by the strap 65 and engages the clutch 30, whereupon the pattern 12 and the work 14, 15 begin to move.

The leading piston 51 finally strikes the stop 69 which by means of the connecting strap 70 moves the lever 67 and thus reverses the intermediate valve 58 to the position of Fig. 10 and opens the path through the flexible tube 84 to the cylinder 47, as shown in Fig. 9. The piston 49 of cylinder 47 is raised by the action of the presure liquid and vertically displaces the carriage 3 in an upward direction. Since the tool carriage 31, through its profiling roller 38, contacts with the pattern 12, the tools 33 and 34 operate on the work 14, during displacement of the carriage 3 in accordance with the motions of the profiling roller 38.

At the completion of an operation and the upward movement, the carriage 3 shifts the lever 67 by the strap 71 and thus places the valve 58 in middle position (Fig. 8) whereby the liquid under the piston 49 is shut off and the carriage 3 remains in the uppermost position. At the same time, the connecting strap 64 acts on the lever 60 and thereby on the toothed segment 61 and the intermediate valve 57, Fig. 10, so that a current of liquid enters through the flexible tube 50, the cylinder 48 and displaces the piston 51, for instance to the left as in Fig. 3, until the piston 51 strikes the stop 53 and thus places the tool carriage 31 into its rearmost inoperative position. Simultaneously with the lever 60 the coupling lever 66 is moved by the strap 65 and the clutch 30 is rendered inoperative to cause cessation of the rotary motions of the pattern 12 and work 14, 15.

With the guideway 76 horizontal and the carriage 3 and carrier 6 at their uppermost positions, the machine is ready for producing workpieces of the same size as the pattern. This is possible because as the carriage 3 starts down it carries with it the pin 10ª which in turn pulls along the casing 75, the horizontal guide 74 mounting said casing and the carrier 6 to which guide 74 is attached. There is no relative movement between carriage 3 and carrier 6 because the casing 75 and guideway 76 move horizontally on roller 10$^b$ in response to the pull of roller 77 in slot 78$^a$.

However, when the guideway 76 is inclined away from the horizontal, relative movement between carriage 3 and carrier 6 occurs. Assuming the guideway 76 is slanted upwardly from roller 10$^b$. Then, as carriage 3 pulls the carrier 6 down on the non-working downstroke and roller 77 in guide slot 78$^a$ pulls casing 75 to the left (Figs. 5 and 6) the inclined guideway 76 is subjected to a cam action on roller 10$^b$ which forces carrier 6 (through 75 and 74 to descend faster than carriage 3. Thus, in the same time that carriage 3 descends to its downward limit, carrier 6 travels the same distance plus the additional distance represented by the differential between the highest and lowest point of the inclined guideway 76. Thus, on the working upward stroke the same differential and relative movement would take place and the carrier 6 would take the pattern 12 of one size over the profiling roller 38 in the same time that cutters or tools 33, 34 are being taken over workpieces of a smaller size, thereby accomplishin proportional reduction.

Obviously, when the guideway 76 is inclined downwardly from roller 10$^b$, the reverse is true, the carrier 6 travels slower than carriage 3 (covering a shorter distance in the same time) and thereby permits proportional enlargement.

When a pattern smaller than the full size is used, the clamping nut 80 is loosened and raised in vertical slot 81 and fastened at a point opposite the marking of scale 82 which corresponds to the height of the pattern. The guide 78 is, of course, displaced upwardly in a clockwise direction. Then when the inoperative down stroke of the machine is made, the roller 77 which travels in the guide slot 78$a$ of guide 78, encounters the nut 80 and is stopped. This, in turn, stops the descent of the horizontally slidable casing 75 in which roller 77 is mounted and also the carrier 6 to which the casing 75 is connected by guide 74 which is fastened to the carrier 6. Descent of the carriage 3 is not stopped but continues until the stop 63 thereof encounters lever 60 to institute the up stroke of the machine. The up stroke of the carrier 6 will be completed first, at which time the formation of the work will also be completed. However, the carriage 3 will continue upwardly until it reaches its upper limit, as aforesaid.

I claim:

1. A copying lathe for making non-circular forms, particlarly lasts, after a given pattern, comprising a frame, a carriage for the vertical displacement of the work and pattern, means for rotating the work and the pattern, an additional carriage in the frame mounted for horizontal displacement towards and away from said work and pattern, tools on said last named carriage, a profiling roller on said last named carriage for controlling the movement of the carriage toward the work in accordance with the diameter of the pattern and thereby controlling the depth of cut of the tools, means for gradually regulating the speed of rotation of the work and pattern, and means operable by the movement of the second mentioned carriage for actuating said regulating means to vary the speed of rotation of the work and pattern in accordance with the diameter of the pattern.

2. In a copying lathe, including means for mounting a pattern and at least one work piece therein, means for rotating said pattern and work piece, a profiling member engageable with said pattern, means mounting the profiling member for movement toward the pattern in accordance with the diameter thereof, a tool engageable with said work piece, means mounting said tool for movement toward the work for different depths of cut, means controlling the movement of said tool in accordance with the movement of said profiling member, means for gradually varying the speed of rotation of said work piece and pattern, and means operable by the movement of said profiling member for automatically actuating said speed varying means in accordance with the diameter of said pattern.

3. In a copying lathe, including means for mounting a pattern and at least one work piece therein, means for rotating said pattern and work piece, a profiling member engageable with said pattern, means mounting the profiling member for movement toward the pattern in accordance with the diameter thereof, a tool engageable with said work piece, means mounting said tool for movement toward the work for different depths of cut, means controlling the movement of said tool in accordance with the movement of said profiling member, a transmission for gradually varying without perceptible gradations the speed of rotation of said work piece and pattern, and means automatically operable by the movement of said profiling member for actuating said transmission in accordance with the diameter of said pattern.

WILLY WENZIG.